No. 645,243. Patented Mar. 13, 1900.
J. E. WILLIAMS.
COMBINED REIN AND WHIP HOLDER.
(Application filed Apr. 18, 1899.)

(No Model.) 2 Sheets—Sheet 1.

Witnesses
Howard D. Orr.
H. J. Riley.

John E. Williams, Inventor.
By his Attorneys,
C. A. Snow & Co.

THE NORRIS PETERS CO., PHOTO-LITHO., WASHINGTON, D. C.

No. 645,243. Patented Mar. 13, 1900.
J. E. WILLIAMS.
COMBINED REIN AND WHIP HOLDER.
(Application filed Apr. 18, 1899.)
(No Model.) 2 Sheets—Sheet 2.
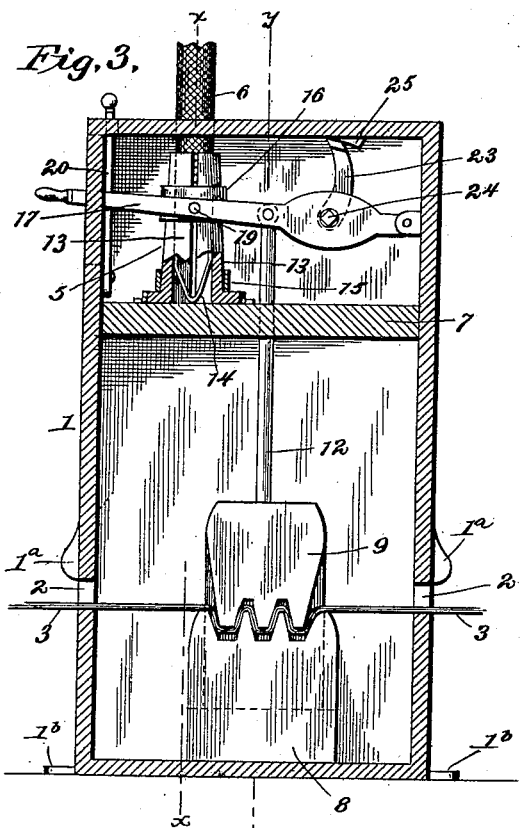
Witnesses
Howard D. Orr.
N. J. Riley
John E. Williams, Inventor,
By his Attorneys,
C. A. Snow & Co.

UNITED STATES PATENT OFFICE.

JOHN E. WILLIAMS, OF PHILADELPHIA, PENNSYLVANIA.

COMBINED REIN AND WHIP HOLDER.

SPECIFICATION forming part of Letters Patent No. 645,243, dated March 13, 1900.

Application filed April 18, 1899. Serial No. 713,450. (No model.)

*To all whom it may concern:*

Be it known that I, JOHN E. WILLIAMS, a citizen of the United States, residing at Philadelphia, in the county of Philadelphia and State of Pennsylvania, have invented a new and useful Rein-Holder and Whip-Socket, of which the following is a specification.

The purpose of this invention is the provision of means for preventing the forcible removal of the whip from its socket and the loosening of the lines or reins from the holder when the team is left standing and unattended by persons not having permission of the driver or supplied with the proper releasing means.

A further object of the invention is to combine in a single structure an element for simultaneously operating the whip-socket and main holder to cause each to grip the parts applied thereto; also, to combine with this operating element a locking device to prevent its movement by unauthorized parties when set and secured to make fast the whip and reins.

Other objects and advantages are contemplated and will appear in the course of the subjoined description in connection with the accompanying drawings.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1:
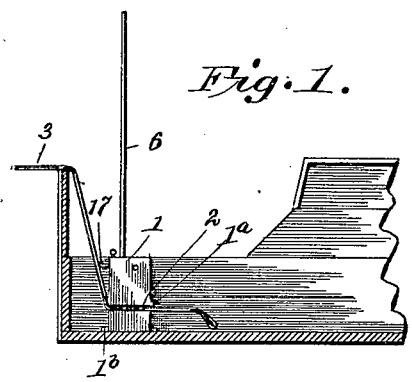
Figure 7:
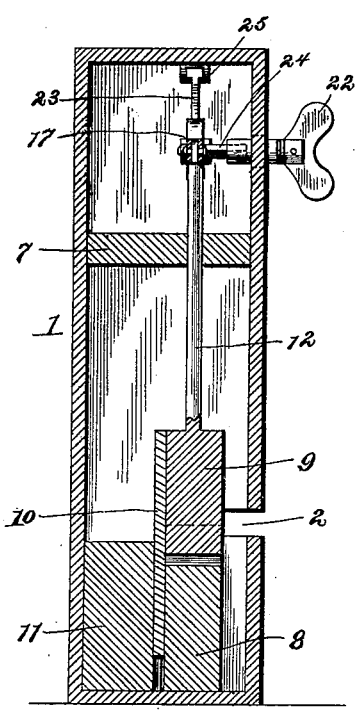
Figure 2:
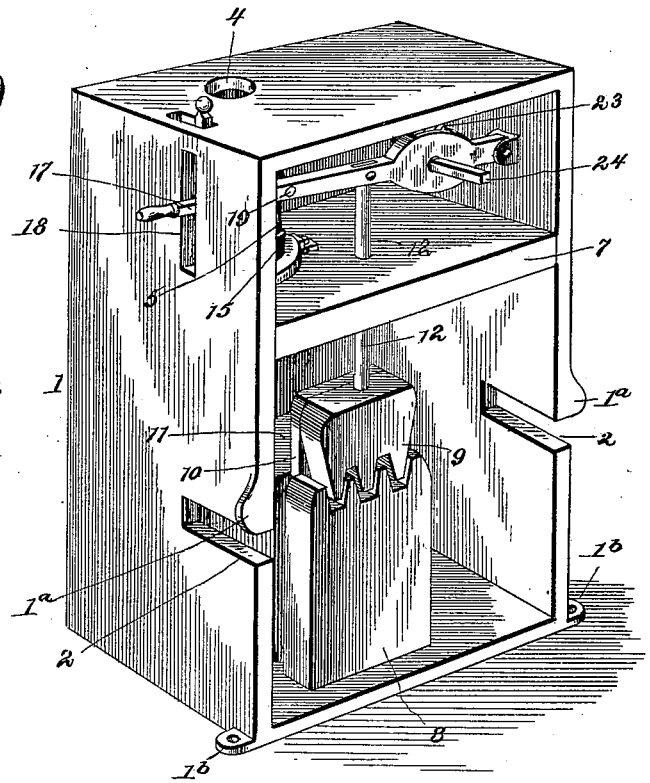

Figure 1 is a detail view showing the invention in operative relation. Fig. 2 is a perspective view, the front side of the casing being removed, so as to expose the working parts. Fig. 3 is a front view showing the relation of the parts when moved to a position for securing the whip and lines, the lower portion of the whip-socket jaws being broken away and the front side of the casing removed. Fig. 4 is a top plan view, the upper wall of the casing being removed. Fig. 5 is a section on the line X X of Fig. 2, the front wall of the casing being in position. Fig. 6 is a detail view in perspective of the operating-lever and the parts carried thereby. Fig. 7 is a detail section on the line Y Y of Fig. 2, the front wall of the casing being in place and the key being applied to the shaft of the locking-arm.

Corresponding and like parts are referred to in the following description and indicated in all the views of the drawings by the same reference characters.

The casing 1 for inclosing the working elements of the device may be of any desired configuration and size, and, as shown, is of rectangular outline and is adapted to be securely fastened to the bottom of the vehicle by means of bolts or other suitable fastening devices which pass through perforated ears $1^b$, located at the bottom of the casing at opposite sides thereof. A slot 2 is formed in one side of the casing near its lower end and is designated to receive the reins or lines 3, and in order to enable the latter to be readily introduced into the slot at night when the aperture cannot be seen the casing is provided at opposite sides with projections or flanges $1^a$, which depend slightly below the upper wall of the slot. The top of the casing has an opening 4 in vertical alinement with the whip-socket 5 to admit of the whip 6 being thrust therethrough when placing it in the socket. A partition 7 subdivides the casing into upper and lower compartments, the lower compartment receiving the rein-holding means and the upper compartment containing the whip-socket and the operating means for the rein-holder and whip-socket. A jaw 8 is placed upon the bottom of the casing and coöperates with a companion jaw 9 to grip between them the reins or lines 3. These jaws or sections 8 and 9 may be of any desired material and are preferably constructed of rubber or like material, so as to yield and admit of the operating-lever moving to the limit of its downward throw, which is essential to provide for the proper operation of the locking means. The gripping-faces of the jaws are toothed, roughened, or similarly constructed to insure the firm and positive gripping of the reins between them. One of the jaws is provided with a guard 10 to extend across the space formed between the jaws when the latter are separated, so as to prevent the lines from passing from between the jaws when thrust hurriedly into position. This guard 10 is preferably attached to the upper or movable jaw 9 and operates in the space formed between the rear side of the lower jaw 8 and a block 11, located in the rear thereof. The movable jaw 9 is attached to the lower end of a rod 12, which operates in a vertical opening formed in the partition 7 and which is pivotally connected at its upper end to the operating-lever.

The whip-socket 5 is composed of companion jaws 13, which are hinged at their lower ends to the partition 7 and which are separable at their upper ends to receive between them the butt-ends of whips of different sizes. A spring 14 of approximately V shape is placed within the lower end portion of the whip-socket and is adapted to exert an outward pressure against the jaws 13, so as to hold the whip-socket open when unrestrained to admit of the whip being readily thrust therein. A band 15 encircles the lower portion of the jaws 13 and limits their outward movement. The upper end portions of the jaws 13 taper slightly to coöperate with a clamp-band 16, whereby the jaws are forced together and caused to grip the whip received in the whip-socket.

The operating-lever 17 extends transversely of the casing and is pivotally connected at its inner end to a side wall thereof, its opposite end operating in a slot 18, formed in the other side of the casing and projecting a sufficient distance to afford a handhold for conveniently operating the part when desired. The upper end of the rod 12 is connected to the lever 17, and the clamp-band 16 has its arm 19 made fast to the operating-lever, so that a movement of the lever will cause a corresponding movement of the whip-socket and rein-holder, so as to simultaneously release or secure the whip and reins accordingly, as may be required. A pivoted dog 20, arranged upon the inner side of the casing and upon one side of the slot 18, is adapted to engage with the movable end portion of the operating-lever and hold it in a depressed position, thereby securing the whip and lines until the driver can procure the key and properly position it for operating the locking mechanism, so as to securely fasten the operating-lever 17 in its operative position. A spring 21 normally exerts a pressure against the pivoted dog 20, so as to hold it in position for instantaneous engagement with the operating-lever after the latter has cleared the engaging shoulder. The upper end portion of the pivoted dog projects above the top of the casing and operates in an opening formed therein, so as to be pressed against when it is required to permit an upward movement of the part 17 to effect the release of the whip and reins.

The locking device operated by means of the key 22 is disposed so as to come between the casing and the operating-lever when in position to secure said lever in its lowermost position. In its simplest form this locking device consists of a pivoted arm 23, secured to a shaft 24, journaled to the lever 17. The free end of the pivoted or locking arm 23 is adapted to engage with a cam-surface 25, applied to the inner side of the top of the casing, thereby insuring a firm and positive engagement between the locking-arm and casing and precluding the possibility of accidental displacement. The end of the shaft 24 to which the key 22 is fitted may be variously constructed, so that it can be operated only by means of a key matching therewith. An opening is provided in the casing opposite the shaft 24 for the insertion of the key when fitting it to the part 24.

The whip being placed in the whip-socket and it being required to secure it against forcible removal and at the same time to make fast the reins or lines after the latter have been thrust into the slot 2 and between the jaws of the rein-holder, it is only necessary to depress the projecting end of the operating-lever 17, when the clamp-band 16 and the movable jaw 9 will be lowered and effect a closing of the whip-socket upon the butt of the whip and the rein-holding jaws upon the reins. As the movable end of the operating-lever 17 descends and rides upon the beveled end of the pivoted dog 20 the latter will be repressed against the action of the spring 21, and the instant the engaging shoulder of the pivoted dog clears the operating-lever said dog will spring forward under the influence of its actuating-spring and cause its shoulder to engage over the upper edge of the operating-lever and hold the latter depressed. The driver can now take his time in securing the key for operating the locking device, whereby the operating-lever is held against movement to release the parts by any unauthorized party.

Having thus described the invention, what is claimed as new, and desired to be secured by Letters Patent, is—

1. A device of the class described, comprising a casing provided at its top with a whip-opening and having a transverse slot or opening to receive the reins, a whip-socket arranged within the casing and composed of two approximately-semicylindrical sections arranged beneath the opening of the top of the casing, a rein-holder located within the casing and composed of sections located at the transverse slot or opening and adapted to clamp the reins, an operating element mounted within the casing and extending through the same and connected with and adapted to actuate the sections of the whip-socket and the rein-holder to cause the same to grip and release a whip and reins, and means for locking the operating element against movement, substantially as described.

2. A device of the class described, comprising a casing, a vertical whip-socket mounted within the casing and composed of two approximately-semicylindrical sections, a rein-holder arranged within the casing and composed of two sections adapted to clamp the reins between them, an operating-lever fulcrumed within the casing and extending through the same and connected with the whip-socket and the rein-holder and adapted to actuate the sections thereof to grip and release a whip and reins, and a pivotally-mounted arm located within the casing and interposed between the same and the lever and adapted to lock the latter against movement, substantially as and for the purpose described.

3. A device of the class described comprising a casing, a whip-socket having approximately-semicylindrical sections, a rein-holder located at a point beneath the whip-socket and having upper and lower sections, the upper section being movable, a horizontal operating-lever fulcrumed at one end on the casing and extending through the same and connected with the whip-holder and adapted to actuate the sections thereof, a rod extending from the lever to the upper section of the rein-holder, and means for locking the lever against movement, substantially as described.

4. A device of the class described comprising a casing, a whip-socket composed of approximately-semicylindrical sections, a horizontal lever fulcrumed at one side of the casing and extending through the opposite side thereof and adapted to actuate the sections of the whip-socket, a rein-holder composed of upper and lower sections, the upper section being movable, a rod connecting the upper section of the rein-holder with the lever, and an arm pivotally mounted on the lever and arranged to engage the casing, whereby the lever is locked against movement, substantially as described.

5. A device of the class described comprising a casing, a whip-socket mounted in the casing at the top thereof and composed of sections, a rein-holder located below the whip-socket and having a movable section, a horizontal lever fulcrumed within the casing and connected with the sections of the whip-socket, and a vertical rod depending from the lever and connected with the movable section of the rein-holder, substantially as described.

6. In a device of the class described, the combination of a casing having a horizontal opening, a rein-holder mounted within the casing and composed of sections having engaging faces arranged in alinement with the opening of the casing, one of the sections being movable, means for operating the movable section of the rein-holder, and the projections or flanges 1ª mounted on the casing at opposite sides thereof and located adjacent to the said opening and adapted to enable the reins to be readily guided into the same, substantially as described.

7. In combination, a casing having a slot for the reception of the reins, coöperating jaws for gripping the reins, an expansible whip-socket, an operating-lever having the movable jaw of the rein-holder connected therewith, a clamping device movable with the operating-lever and adapted to contract the whip-socket, and a locking device for securing the operating-lever when moved to a position to secure the whip and reins against forcible displacement, substantially as set forth.

8. In combination, a casing having a rein-receiving slot, coöperating jaws located within the casing opposite said slot, an expansible whip-socket located within the casing and accessible through an opening formed in said casing, an operating-lever for actuating the parts comprising the whip-socket and rein-holder, a hand-operated locking device for securing the operating-lever when moved to a position for actuating the parts of the whip-socket and rein-holder, and a key-operated locking device for securing the operating-lever against surreptitious movement, substantially as described.

9. In combination, a casing having a rein-receiving slot and subdivided by a horizontal partition, coöperating jaws located in the lower compartment opposite the rein-receiving slot, a whip-socket arranged in the upper compartment and mounted upon the said partition, an operating-lever fulcrumed at one end within the casing and having its opposite end portions projecting through a slot in a side of the casing; a rod connecting the operating-lever with a movable jaw of the rein-holder and operating in an opening formed in the said partition, a hand-operated pivoted dog for engagement with the movable end of the operating-lever, a clamp-band carried by the operating-lever and coöperating with the whip-socket, and a key-operated locking-arm pivotally mounted upon the said operating-lever and adapted to secure it and the parts actuated thereby against surreptitious displacement, substantially as and for the purpose set forth.

In testimony that I claim the foregoing as my own I have hereto affixed my signature in the presence of two witnesses.

JOHN E. WILLIAMS.

Witnesses:
CHAS. H. DOUGHERTY,
CHAS. H. DOUGHERTY.